United States Patent
Ledebuhr

(10) Patent No.: US 10,159,184 B2
(45) Date of Patent: Dec. 25, 2018

(54) VEGETATION CUT AND APPLICATION METHOD AND APPARATUS

(71) Applicant: Mark A. Ledebuhr, Lansing, MI (US)

(72) Inventor: Mark A. Ledebuhr, Lansing, MI (US)

(73) Assignee: Application Insight, LLC, Lansing, MI (US)

( * ) Notice: Subject to any disclaimer, the term of this patent is extended or adjusted under 35 U.S.C. 154(b) by 184 days.

(21) Appl. No.: 14/961,986

(22) Filed: Dec. 8, 2015

(65) Prior Publication Data

US 2016/0157426 A1 Jun. 9, 2016

Related U.S. Application Data

(60) Provisional application No. 62/089,629, filed on Dec. 9, 2014.

(51) Int. Cl.
*A01D 43/14* (2006.01)
*A01G 3/053* (2006.01)

(52) U.S. Cl.
CPC ............ *A01D 43/14* (2013.01); *A01G 3/053* (2013.01); *Y02A 90/40* (2018.01)

(58) Field of Classification Search
CPC .................................. A01D 43/14; A01D 43/00
See application file for complete search history.

(56) References Cited

U.S. PATENT DOCUMENTS

| | | | |
|---|---|---|---|
| 773,743 A * | 11/1904 | Hoffmann | A01M 7/0064 111/7.1 |
| 1,836,009 A | 5/1930 | Atkins | |
| 2,726,484 A | 12/1955 | Simpkins | |
| 2,730,838 A | 1/1956 | Wilson | |
| 2,775,032 A | 12/1956 | Sorensen | |
| 2,878,633 A * | 3/1959 | Mullin | A01D 43/14 239/104 |
| 2,951,314 A * | 9/1960 | Laughlin | A01G 1/12 111/7.1 |
| 3,002,319 A | 10/1961 | Laughlin | |
| 3,257,753 A * | 6/1966 | Zennie | A01C 23/006 401/219 |

(Continued)

OTHER PUBLICATIONS

Ipatenco, Sarah; SF Gate; How to Handle a Large Quantity of Grass Clippings; Apr. 20, 2012; retrieved from internet Mar. 7, 2018; https://web.archive.org/web/20120420040912/http://homeguides.sfgate.com/handle-large-quantity-grass-clippings-24321.html (Year : 2012).*

*Primary Examiner* — Kristen C Hayes
(74) *Attorney, Agent, or Firm* — Gardner, Linn, Burkhart & Ondersma, LLP

(57) ABSTRACT

The present invention provides an apparatus and method particularly well suited for cutting vegetation and applying chemical fluids to the stump efficiently over wide areas, particularly with common mechanical devices such as sickle bar trimmers, rotary mowers, and flail mowers. Furthermore, the chemical fluids are precisely applied to the desired vegetation stumps so that the biomass has low chemical residue and the chemicals does not disturb the soil. Therefore, the biomass is preserved, soil residues are reduced, chemical waste is reduced, undesired vegetation is treated with a correct dosage, and manual labor is dramatically reduced. Thus, the soil residues are reduced and the biomass is preserved for further downstream processes.

27 Claims, 13 Drawing Sheets

(56) References Cited

U.S. PATENT DOCUMENTS

| | | | | |
|---|---|---|---|---|
| 4,926,622 | A | * | 5/1990 | McKee .................. A01D 43/14 56/16.8 |
| 5,398,415 | A | | 3/1995 | Collins, Jr. |
| 5,471,745 | A | | 12/1995 | Wendell |
| 5,606,822 | A | * | 3/1997 | Dearhammer ....... A01G 3/0475 47/1.7 |
| 5,813,122 | A | * | 9/1998 | Mubareka .............. A01D 43/14 30/123.3 |
| 5,875,587 | A | | 3/1999 | Stevens |
| 6,446,420 | B1 | * | 9/2002 | Worsham ............... A01D 43/14 56/16.8 |
| 8,544,178 | B2 | * | 10/2013 | Smiley .................. A01D 43/14 30/123.3 |

* cited by examiner

VEGETATION CUT AND APPLICATION METHOD AND APPARATUS

CROSS REFERENCE TO RELATED APPLICATIONS

The present application claims the filing benefits of U.S. provisional application Ser. No. 62/089,629, filed Dec. 9, 2014, which is hereby incorporated herein by reference in its entirety.

FIELD OF THE INVENTION

The present invention generally relates to a method and device for agricultural and vegetation control.

BACKGROUND AND SUMMARY OF THE INVENTION

The present invention is directed to a cutting and liquid chemical application apparatus that cuts vegetation and efficiently applies a chemical, typically a herbicide, to the fresh cut and lateral surfaces of the stump. This "cut and wipe" process eliminates many risks involved in spray application of chemicals and reduces the loss of chemicals to the ground. In particular, the present invention is directed to a mechanized cutter having an integrated liquid applicator particularly positioned in relation to the cutter.

Agriculturists and land managers commonly clear areas of vegetation for many reasons. For example, when harvesting crops, such as wheat, a farmer cuts the stalk or stem with a harvester and collects the grain for further processing. Likewise, land stewards often clear wetland and forest areas of fast-growing invasive plant species, or specifically use fast-growing plants for biological remediation of soil to remove heavy metals from the soil. For example, the invasive plants may be common reed grass, also known as *Phragmites*, loosestrife, or woody brush plants like glossy buckthorn or Japanese honeysuckle. Regardless of the species, whether the mode of control is physical removal or chemical herbicide application, generally the aerial portion of the plant in question must be removed for sunlight to penetrate the area and allow native or other plants to regenerate. The remaining live stump or stem then dies from the specific chemical fluid. Typically this removal step is a physically separate step from chemical application, resulting in additional costs and complexity. Generally an operator wishes to remove cut biomass.

Higher quality biomass for further processing requires reducing the residues and contaminates in the biomass. The biomass can then be either disposed or used in a downstream process, such as food production or processing into biofuels. However, producing higher quality biomass is expensive and inefficient with some manual or mechanical devices, which may also disturb the soil and have high off-target losses of chemical fluids that can create risks to surrounding vegetation, water, and potentially human health, as well as costly losses of chemical fluids. In environments where the invasive species are integrated with sensitive habitats or Threatened and Endangered (T&E) species, precise control of the application and mitigation of off-target chemical losses are critical to legal application and successful control.

The present invention provides an apparatus and method particularly well suited for cutting vegetation and applying chemical fluids to the stump efficiently over wide areas, particularly with common mechanical devices such as sickle bar trimmers, sicklebar cutters, rotary mowers, harvesters, and flail mowers. Prior art and existing products apply the herbicide or chemical fluids directly to a blade, whether by hand or by a mechanical metering method. This contact with the fast-moving blade imparts a substantial amount of kinetic energy into the chemical, causing unintended atomization that reduces the chemicals' effectiveness, and losses of chemicals. Furthermore, the chemical fluids are also applied to all surfaces exposed to the mowing or cutting activity, including the plant tissues of the cut biomass. This contaminates the biomass, such that it is less usable for downstream process, and a waste of chemical fluids by applying them to surfaces where they will not be effective.

Thus, applying chemicals with a spray droplet transfer process of some type or mechanical method often forces operators to reduce the concentration or dosage of the chemicals to provide adequate coverage. The reduced dosage reduces the efficiency of the treatments and increases costs by requiring applicators to transport large volumes of diluent (normally water) along with the chemical fluids to complete the application. Therefore, employing selective methods, such as cutting and wiping, requires using slow labor intensive methods to cut the vegetation, apply herbicides or other chemical fluids by hand, and collect the biomass. Slow and inefficient application of the chemical fluids after cutting the vegetation allows the vegetation to seal its vascular system at the cut wound, which reduces the amount of herbicide that reaches the vegetation's roots by capillary action and reduces the herbicide's effectiveness. However, this extensive process is often required to completely remove invasive species from a site, but due to the low productivity and arduous nature of the work, becomes cost prohibitive.

Applying the chemical fluids precisely to the desired vegetation stumps immediately after cutting improves efficiency and reduces losses due to contaminated biomass and non-target vegetation. Therefore, at sites where cut and chemical application is required, the biomass and soil has reduced chemical residue, chemical waste is reduced, undesired vegetation is treated with an adequate herbicide dosage quickly, and manual labor is dramatically reduced. Thus, soil residues are reduced and biomass is preserved for further downstream processes.

According to an aspect of the present invention a method for cutting and applying a chemical to vegetation includes cutting vegetation stems with a cutting implement to remove biomass from the stems. Furthermore, applying a chemical to a stump portion of the vegetation stems below and behind the cutting implement, for example, by dragging the applicator over the stump that spatially separates cutting and applying the chemical. Applying the chemical is substantially and contemporaneously in a continuous motion with cutting the vegetation stems.

Furthermore, according to an aspect of the present invention a vegetation cut and chemical application apparatus includes the cutting implement, a chemical reserve container, and a porous and absorbent chemical applicator. The chemical reserve container is in fluid communication with the applicator and supplies chemicals from the container, through the apparatus, and to the applicator. The cutting implement has a bottom side and a cutting side and the applicator is affixed to the bottom side of the cutting implement. Furthermore, applicator is configured to restrict the applicator from being in fluid communication with the cutting side by being disposed behind and below a cutting plane of the cutting implement. The apparatus, therefore, cuts vegetation with the cutting implement and applies chemical fluids to the stumps.

Thus, it will be appreciated that the apparatus and method can cut vegetation and apply chemical fluids to the stump efficiently over wide areas, particularly with common mechanical devices such as sickle bar trimmers, rotary mowers, and flail mowers. Furthermore, the chemical fluids are precisely applied so that the biomass has reduced chemical residue. The apparatus cuts vegetation with a cutting implement and applies chemical fluids to the stumps behind and below a cutting plane of the implement. Therefore, the amount of chemical fluids applied to biomass and adjacent non-target areas is reduced, chemical waste is reduced, undesired vegetation is treated with a correct dosage, and manual labor is dramatically reduced. Thus, biomass is preserved for further downstream processes or left behind, and the soil residues are reduced with reduced losses of chemical as compared to conventional spray applications.

These and other objects, advantages, purposes and features of this invention will become apparent upon review of the following specification in conjunction with the drawings.

DESCRIPTION OF THE PREFERRED EMBODIMENTS

Figure 1:
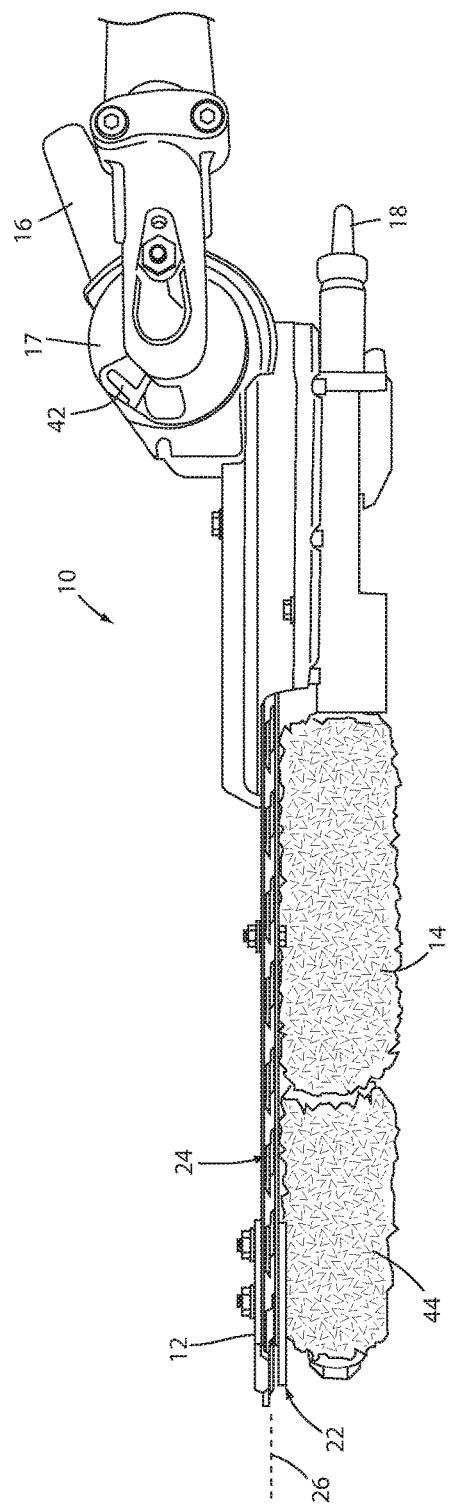
FIG. 1 is a side elevation view of a vegetation cut and chemical application apparatus on a powered sickle bar cutter, with chemical ingress hose detached.
Figure 1A:
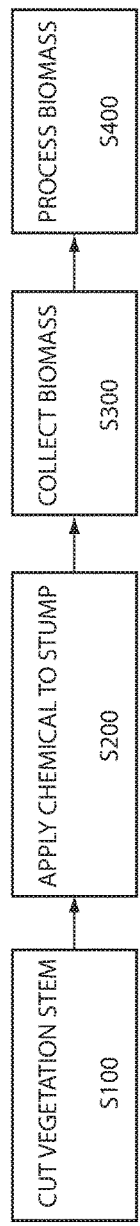
FIG. 1a is a flow diagram of a method for cutting vegetation and applying chemical treatment, in accordance with the present invention.
Figure 1B:
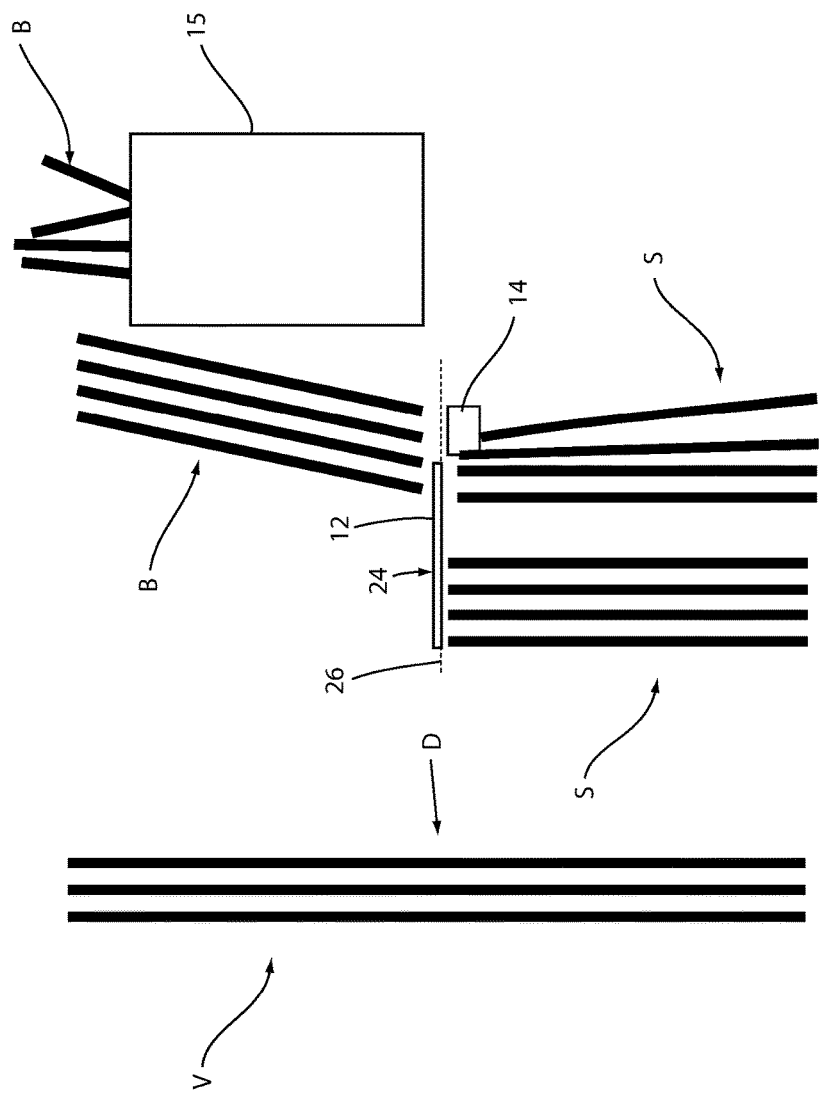
FIG. 1b is a schematic diagram of operating the method for cutting vegetation, applying chemical treatment, and collecting biomass.
Figure 2:
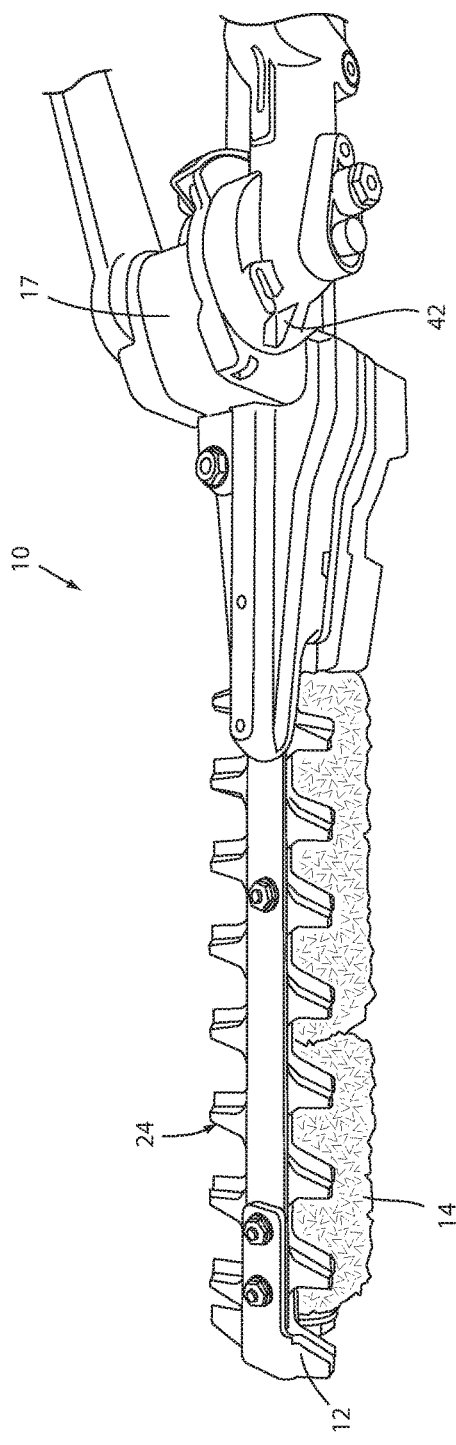
FIG. 2 is a top perspective view of the vegetation cut and chemical application apparatus of FIG. 1.
Figure 3:
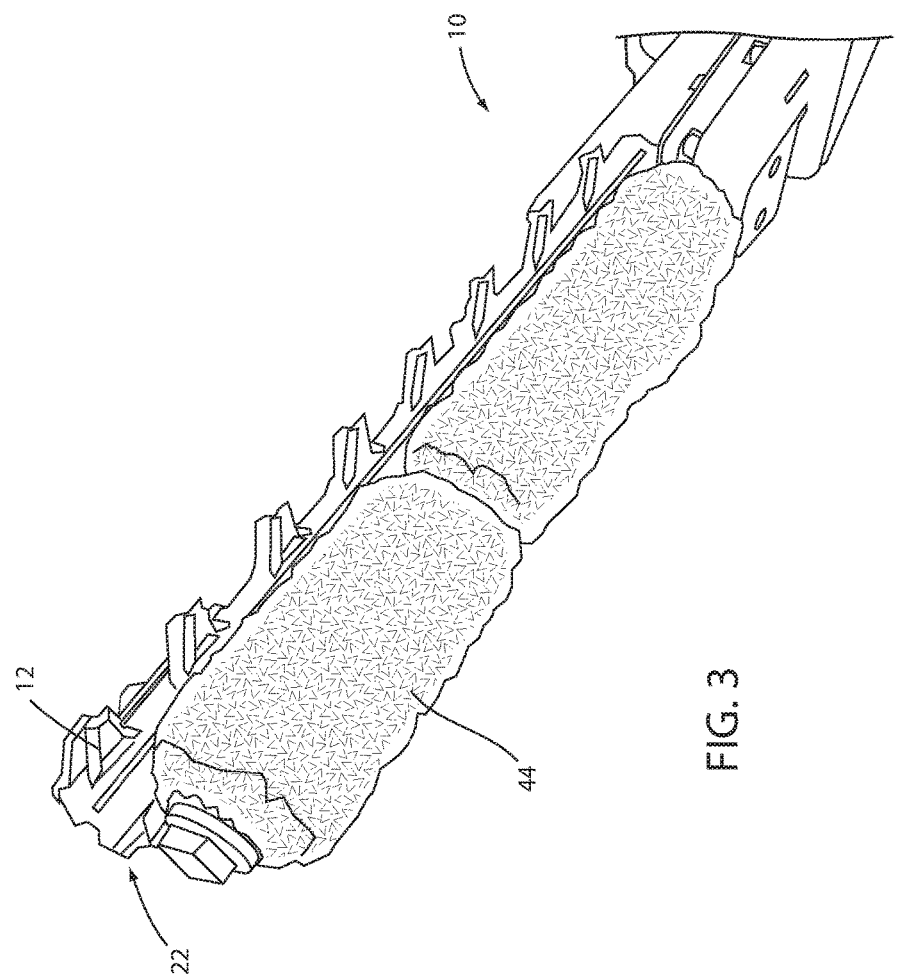
FIG. 3 is a bottom perspective view of the vegetation cut and chemical application apparatus of FIG. 1.
Figure 4:
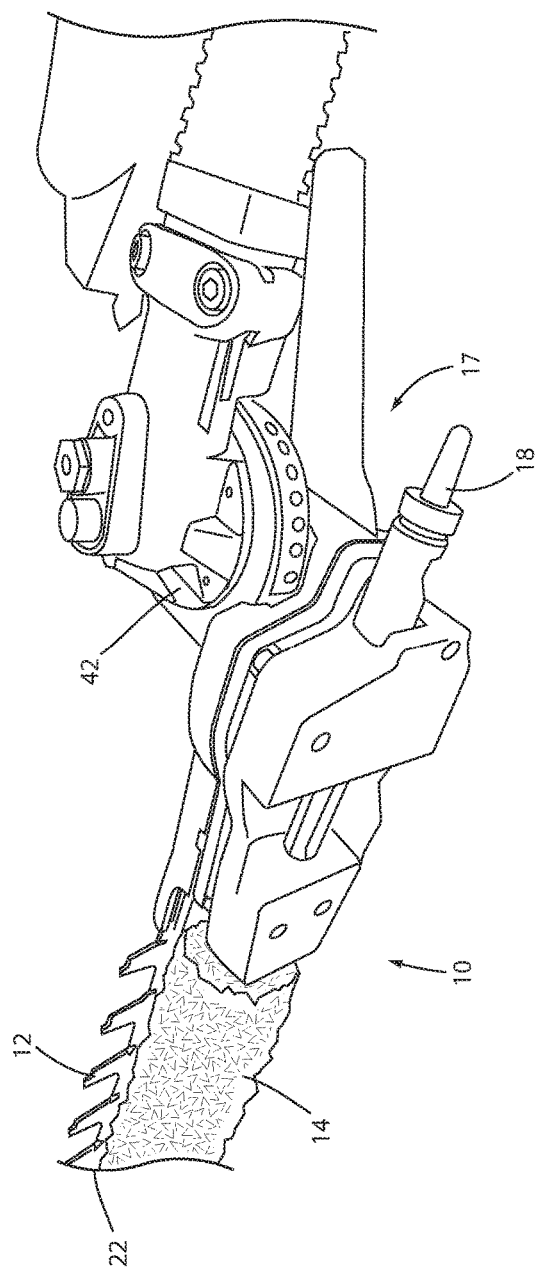
FIG. 4 is a rear perspective view of the vegetation cut and chemical application apparatus of FIG. 1, with hose detached.

The present invention will now be described with reference to the accompanying figures, wherein the numbered elements in the following written description correspond to like-numbered elements in the figures. Referring now to the drawings and illustrative embodiments depicted therein, in particular FIGS. 1a-b, and 1, a method for cutting S100 and applying a chemical S200 to vegetation V includes cutting S100 vegetation stems with a cutting implement 12 in direction D to remove biomass B from the stems S. Furthermore, applying S200 the chemical to a stump portion S of the vegetation below the cutting implement 12 substantially contemporaneously in a substantially continuous motion with the cutting S100 the vegetation V (see FIGS. 10a-b). Applying S100 the chemical to the stump portion S below the cutting implement 12 restricts chemical from being inadvertently applied to the harvested biomass B portion. Furthermore, applying the chemical S200 to the stump portion of the vegetation V with applicator 14 behind the cutting implement 12 further separates the biomass B from the chemical. Therefore, the chemical does not contaminate the biomass B, and the biomass B can be used in further downstream processes S400 when collected S300 with collector 15.

In the illustrated embodiment, for example, the method further includes collecting the biomass B for further processing S300-S400 with collector 15. Collecting S300 the biomass B may be done at many times, for example immediately following cutting the S100 vegetation V and applying S200 the chemical, or after a substantial period of time following cutting S100 the vegetation V and applying the chemical S200. At any time, collecting S300 the biomass B may further include operating an agricultural vehicle, such as a tractor, lawn mower, or harvester. Operating the vehicle provides for securing the cutting implement 12 and the applicator 14 to the vehicle while cutting S100. Furthermore, operating the agricultural vehicle provides power to the cutting implement 12 and an applicator 14. However, in an alternative embodiment cutting S100 the vegetation V, applying S200 the chemical, and collecting S300 the biomass B is manually operated.

Collecting S300 the biomass B for further processing may be completed for many reasons. Further processing S400 may produce usable materials that can be sold to offset costs of maintaining crops or land. Furthermore, selling the usable materials may offset costs of cutting S100 vegetation V and applying S200 the chemical, or even earn a profit for the operator. For example, the processing S400 may be related to removing invasive species from the land. Some species, such as reed grass and thistle are undesirable in many areas, yet grow rapidly. Cutting S100 the vegetation V and collecting S300 the biomass B of the invasive species efficiently leads to improved conditions, such as availability of sunlight, water, and soil nutrients, for the desirable vegetation V.

In addition, the processing S400 may be for food production, for example when used with wheat production. Furthermore, processing S400 may be for biofuel production, for example for from biomass of reed grass and sugarcane. Still further, processing S400 may be processing for wastewater treatment and biological remediation, wherein the water is cleaned or the vegetation V is grown to leach heavy metals or excessive nutrients from the soil, then cut, treated with the chemical, and the biomass B is collected and removed. However, in all of these processes S400, the biomass B must have low chemical residue. For example, in the illustrated embodiment, the chemical is a herbicide having a sufficiently high dosage to induce systemic mortality in the stem S and adjacent roots. However, in alternative embodiments, the chemical is selective insecticides, growth regulators, fungicides, or vegetation nutrients. All of these may be useful when applied to freshly pruned surfaces in sicklebar or rotary hedging machines similar to those used in apples, almonds, cherries, and citrus, for example.

Furthermore, in the illustrated embodiment, applying S200 the chemical to the stem S further includes controlling a flow of the chemical from a reserve container 20 to stem S. Controlling the flow of the chemical is substantially synchronous to the cutting of the vegetation V, particularly controlling the flow of the chemical to the stem S behind and below the cutting implement 12 to not contaminate the biomass B with the chemical. Still further, controlling the flow of the chemical from the reserve container 20 to the stem S includes causing a force so the chemical flows from the reserve container 20 to the stem S. For example, controlling a hand valve causes gravity to force the chemical from the reserve container 20 to the stem S. However, controlling the flow of the chemical from the reserve container 20 to the vegetation stem may include operating a pump to cause the chemical from said reserve container 20 to the applicator 14. In particular, controlling the flow of the chemical is part of operating an agricultural vehicle, such as a tractor, lawn mower, or harvester. Therefore, cutting S100 the vegetation V and applying S200 the chemical over wide areas of vegetation V is efficient (see FIGS. 11-13) and safe for the operator.

Figure 11:
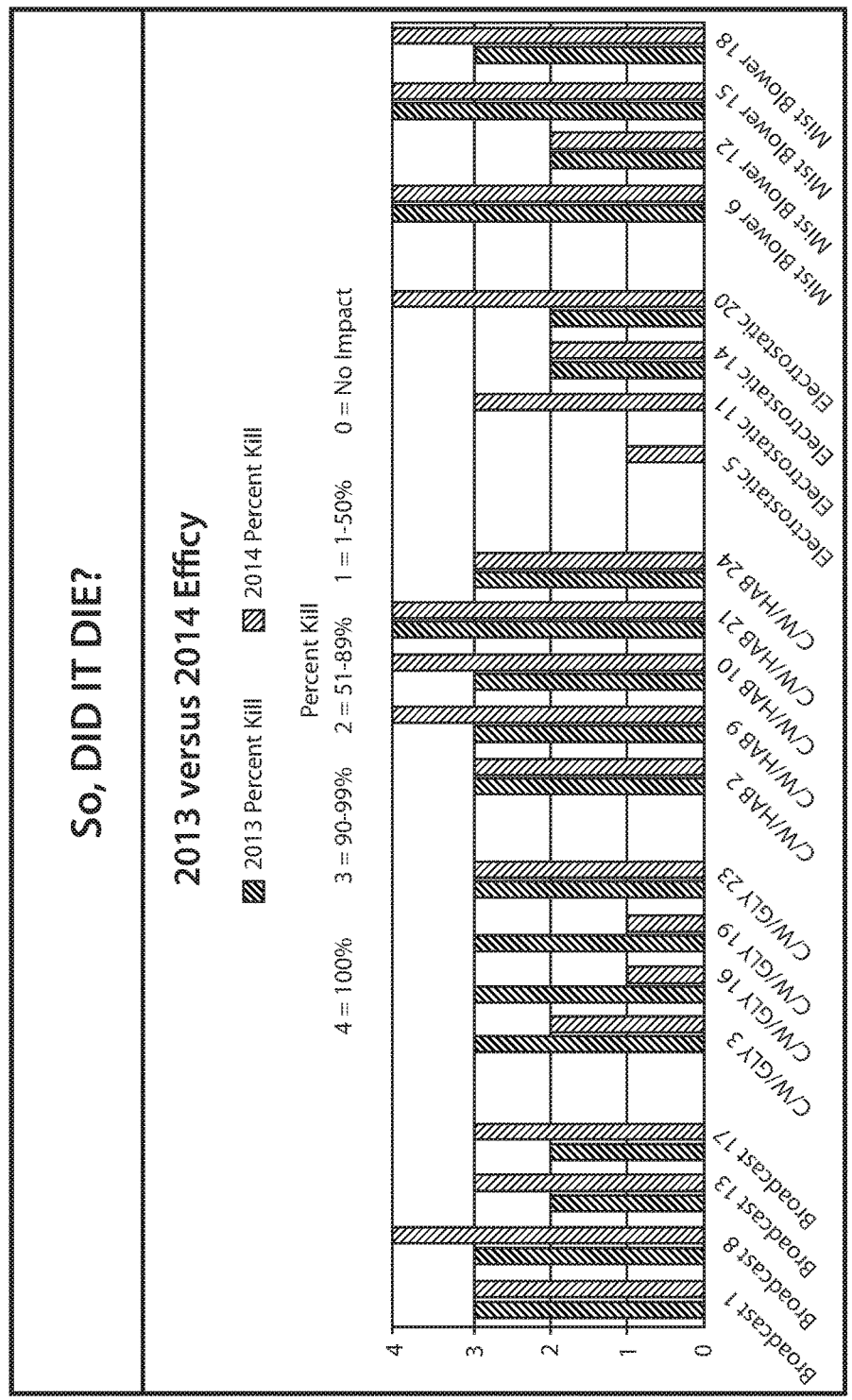
FIG. 11 is a chart of the observed immediate and long-term effectiveness of applying chemicals using the cut and wipe (C/W) method in accordance with the present invention compared to common current methods (including broadcasting, electrostatic, and mist blowing) during testing.
Figure 12:
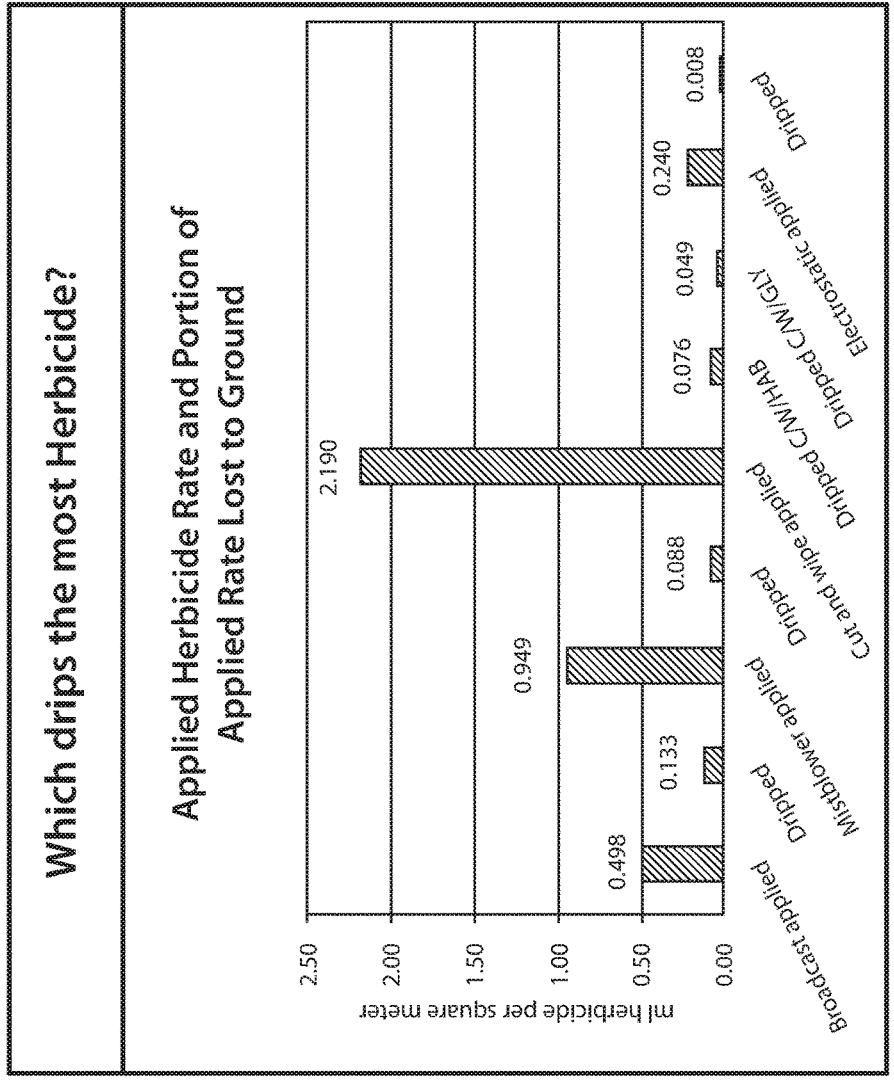
FIG. 12 is a chart of the observed average percent of chemical volume lost to ground for the cut and wipe (C/W) method in accordance with the present invention, for two chemical fluids, compared to common current methods (including broadcasting, electrostatic, and mist blowing) during testing.
Figure 13:
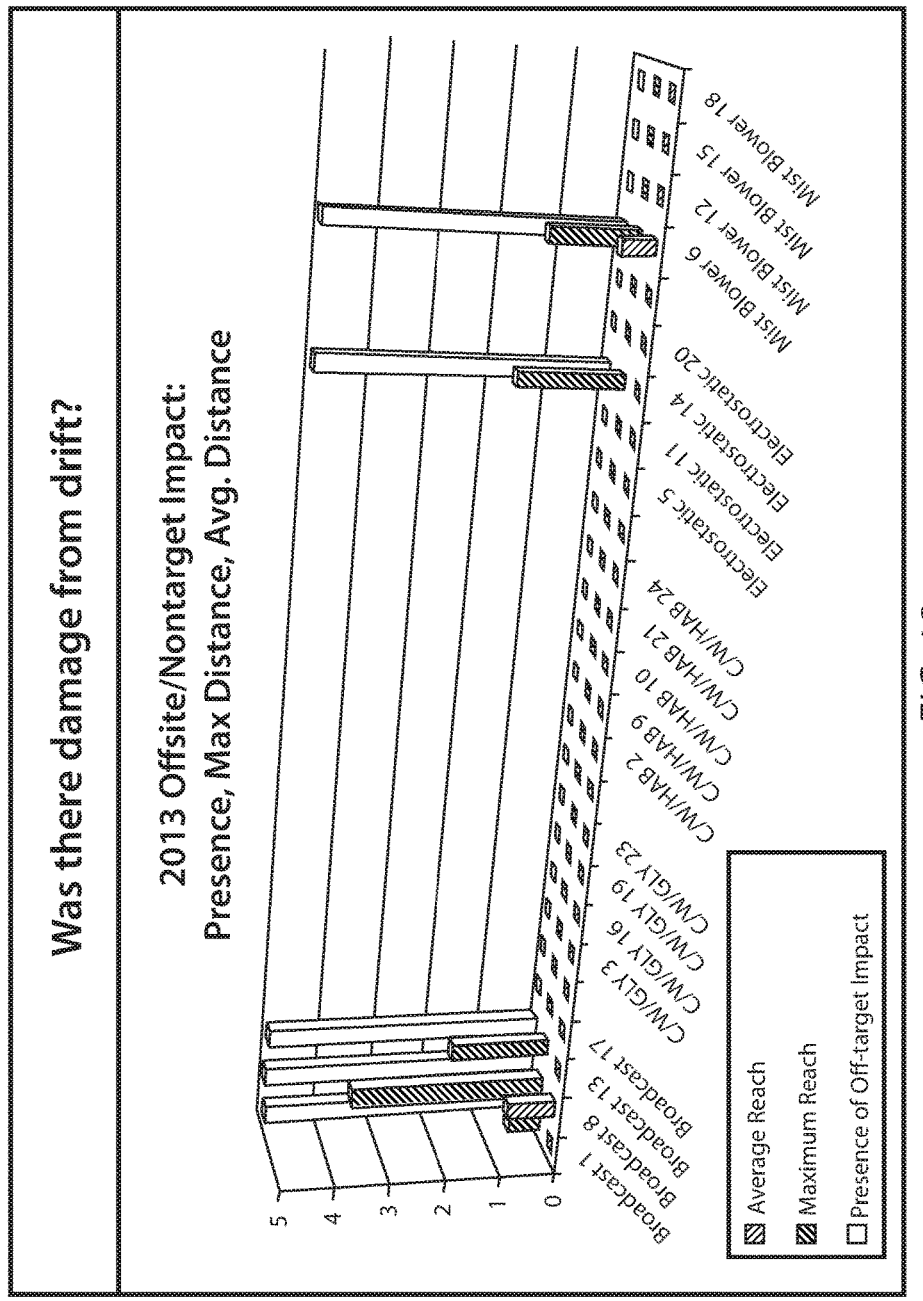
FIG. 13 is a chart of the observed drift damage caused by applying chemicals using the cut and wipe (C/W) method in accordance with the present invention compared to common current methods (including broadcasting, electrostatic, and mist blowing) during testing.

Data from testing, shown in FIG. 11, illustrates the immediate and long-term effectiveness of applying chemicals using the cut and wipe method, as described above, compared to common current methods (such as broadcasting, electrostatic, and mist blowing). The observed average percent of chemical volume lost to ground for the cut and wipe method as described above, from testing, shown in FIG. 12 for two chemical fluids, compared to common current methods (such as broadcasting, electrostatic, and mist blowing). FIG. 13 illustrates the results of testing the drift damage caused by applying chemicals using the cut and wipe, as described above, compared to common current methods (such as broadcasting, electrostatic, and mist blowing).

Figure 10B:
FIG. 10b is a side elevation view of many cut stems with chemical fluid applied.
Figure 10A:
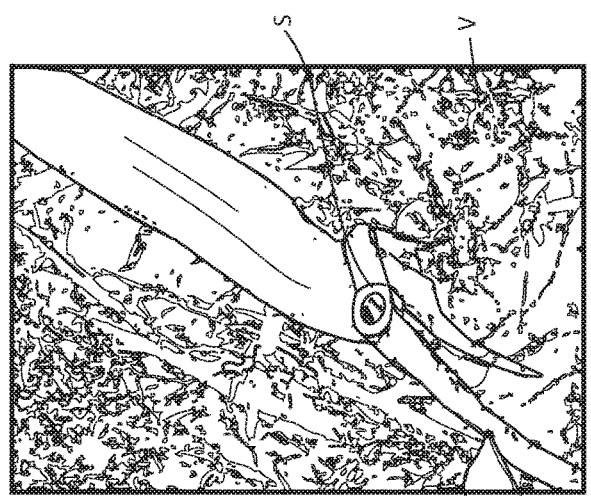
FIG. 10a is a top view of a cut stem with chemical fluid applied.

Referring to FIGS. 1-8, and still in accordance with the present invention, a vegetation cut and chemical application apparatus 10 cuts live vegetation V with the cutting or trimming implement and applies chemical fluids to a stump portion S of the vegetation V (see FIGS. 10a-b). In particular, the apparatus 10 is well suited for using a cutting implement 12 for cutting and applying chemical fluids to a wide area of vegetation V in a single motion. Furthermore, the apparatus 10 is configured to apply chemical fluids only to the stump portion S of the vegetation V, rather than a cut portion, or biomass B. Therefore, the biomass B has low chemical residue. In the illustrated embodiment, and as shown in FIGS. 1-4, the apparatus 10 includes the cutting implement 12, a porous chemical applicator 14 charged with chemical fluids, a handle 16, and a fitting 18 for a chemical reserve container 20. Furthermore, the apparatus 10 cuts the vegetation V with the cutting implement 12 and applies chemical fluids to the stump portion S with the applicator 14 in concurrent movements. The chemical fluid generally includes a combination of glyphosate and imazapyr, although other herbicides such as imazapic, diquat dibromide, pelargonic acid may also be used. Therefore, the apparatus 10 is particularly well-suited for cutting and treating a wide area of vegetation V (see FIGS. 11-13).

The cutting implement 12 includes a bottom side 22 and a cutting side 24, which is opposite the bottom side 22 along a cutting plane 26, and is mounted to a first end 17 of the handle 16. At least one of the bottom side 22 and the cutting side 24 includes a cutting edge. In the illustrated embodiment, the cutting side 24 includes the cutting edge. Generally, an operator orients the cutting implement 12 such that the cutting implement 12 and the cutting plane 26 are horizontal and perpendicular to vegetation V to be cut. The cutting implement 12 shown in FIGS. 1-8 is a sickle bar-type trimmer, wherein the cutting side 24 oscillates linearly along the cutting plane 26 away and toward the operator. Furthermore, the cutting implement 12 may have a length extending from the handle 16 in which the cutting side 24 and bottom side 22 extend along the length. To cut vegetation V, such as a stem S, the cutting side 24 presses the vegetation V against a stationary edge on the cutting implement 12 when the operator laterally moves the cutting implement 12 against vegetation V, and shears the stem. The operator may combine multiple lateral, or swinging, movements near dense areas of vegetation V. Therefore, the cutting implement 12 is particularly well suited to efficiently cut a wide area of vegetation V. In alternative embodiments, the cutting implement 12 is a set of scissor-type shears, such as scissors, a rotary mower (see FIG. 9a), or a flail mower (see FIG. 9b), as further described below.

In addition, the handle 16 may further include a lance 28 to ease cutting and applying chemical fluids to various heights of vegetation V. In the illustrated embodiment, the lance 28 includes a mount for the fitting 18, cutting implement 12, applicator 14, and a motor 30, such as an internal combustion engine. However, in an alternative embodiment, the motor may be an electric motor powered by a battery, which may be the same battery that powers a controller, as described below.

The motor 30 is generally mounted at an end of the lance 28 opposite the cutting implement 12, forming a moment arm. The moment arm having a length generally eases cutting and applying chemicals to a wide area because the operator can quickly and ergonomically swing the apparatus 10 in continuous movements. For either motor, however, the lance 28 also substantially encompasses a drive shaft to power the cutting implement 12 by the motor 30. Positioning the motor 30, which may have a substantial weight, proximate the operator reduces the moment arm that further improves the operator's efficiency and increases the wide area that can be cut (see FIGS. 11-13).

In an alternative embodiment, in which the cutting implement is manually powered, rather than by a motor, the motor may be replaced by an additional handle. In addition, the lance 28 may include a trigger 36, harness mounts 38, and hand grips 40. The lance 28 may further include an adjustable attachment 42 (FIGS. 1, 2, 4), which may pivot the cutting implement 12 and applicator 14 to be perpendicular to vegetation V while the operator holds the apparatus 10 with the hand grips 40 at a higher location.

In the illustrated embodiment, the lance 28 is a lightweight aluminum tube that allows electrical wires, and cabling to be safely routed from the controller 34 to the cutting implement 12 or handle 16 to protect the wires and cabling from entanglement and sharp vegetation V. In an alternative embodiment, a hose from the reserve container 20 to the applicator 14 is also routed through the lance 28. Therefore, the apparatus 10 is particularly well suited for the operator to ergonomically and efficiently cut and apply chemical fluids to wide areas of vegetation V (see FIGS. 11-13).

Figure 5:
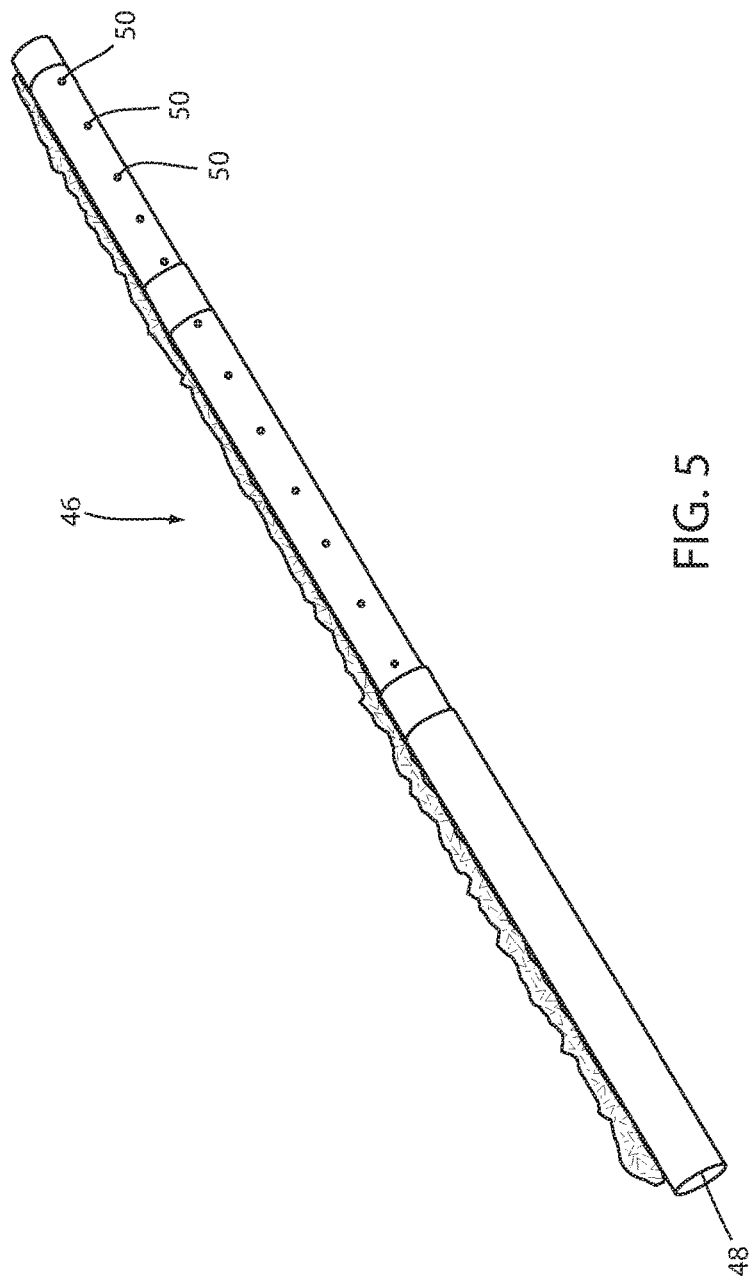
FIG. 5 is a top view of applicator pipe of the vegetation cut and chemical application apparatus of FIG. 1.

The porous chemical applicator 14 is affixed to the bottom side 22 of the cutting implement 12 and proximate to the first end 17 of the handle 16. In the illustrated embodiment, the applicator 14 includes an elongated fibrous member 44 and a fill pipe 46 (FIG. 5). The applicator 14 is configured so that the chemical fluid enters the fill pipe 46 at a first end 48 and dispenses through a plurality of apertures 50 of the fill pipe 46 to the elongated fibrous member 44. For example, in the illustrated embodiment, the elongated fibrous member 44 encompasses the fill pipe 46, and both are mounted to the first end 17 the handle 16. The chemical fluid soaks into an interior side 52 of the fibrous elongated member 44 and dispenses from an exterior side 54 of the member 44. Therefore, the apparatus 10 dispenses the chemical fluid evenly across the applicator 14. In the illustrated embodiment, the applicator 14 is fabricated from multiple rollers, similar to paint rollers. In an alternative embodiment, the applicator 14 is fabricated from an elongated canvas tube, similar to a fire hose. Therefore, it will be appreciated that many types of fibrous materials may be used for the applicator 14.

Because the applicator 14 is affixed to the bottom side 22 of the cutting element, and separated from the cutting side 24 and the cutting plane 26, the chemical fluid only touches the bottom side 22 of the cutting element. The applicator 14, therefore, only applies the chemical fluid only to the stump S and none of the chemical fluid reaches the biomass B, such that the apparatus 10 does not contaminate the biomass B. Since the biomass B has low chemical residue, the biomass B is available for harvesting or further use in downstream processes. Furthermore, since the apparatus 10 cuts the vegetation V with the cutting implement 12 and applies chemical fluids to the stump portion S with the applicator 14 in concurrent movements, the apparatus 10 is particularly well suited for efficiently cutting and treating a wide area of vegetation V. The applicator 14 may also include a cover or guard configured to prevent or reduce the amount of debris, stumps S, or biomass B that contact the applicator 14, which may damage and reduce the life of the applicator 14.

Furthermore, the applicator 14 is recharged with chemical fluids by a first end 48 of the fill pipe 46 that is in fluid communication with the fitting 18. The fitting 18 is in further fluid communication with the reserve container 20 (see FIGS. 7, 8), which holds the chemical fluids, via the hose, which may include a first hose 56 and second hose 58 and a lance pipe 60. Generally, the lance pipe 60 is parallel to or substantially encompassed by the lance 28. In the illustrated embodiment the first hose 56 is in fluid communication from the reserve container 20 connected to a pump 62 to the lance pipe 60, and the second hose 58 is in fluid communication from the lance pipe 60 to the fitting 18. Furthermore, the second hose 58 includes a hand valve 64, for the operator to manually turn on and off the flow of chemical fluids. It will be appreciated that the hand valve 64 may be many types of common valves, such as a ball valve or a butterfly valve.

Figure 6:
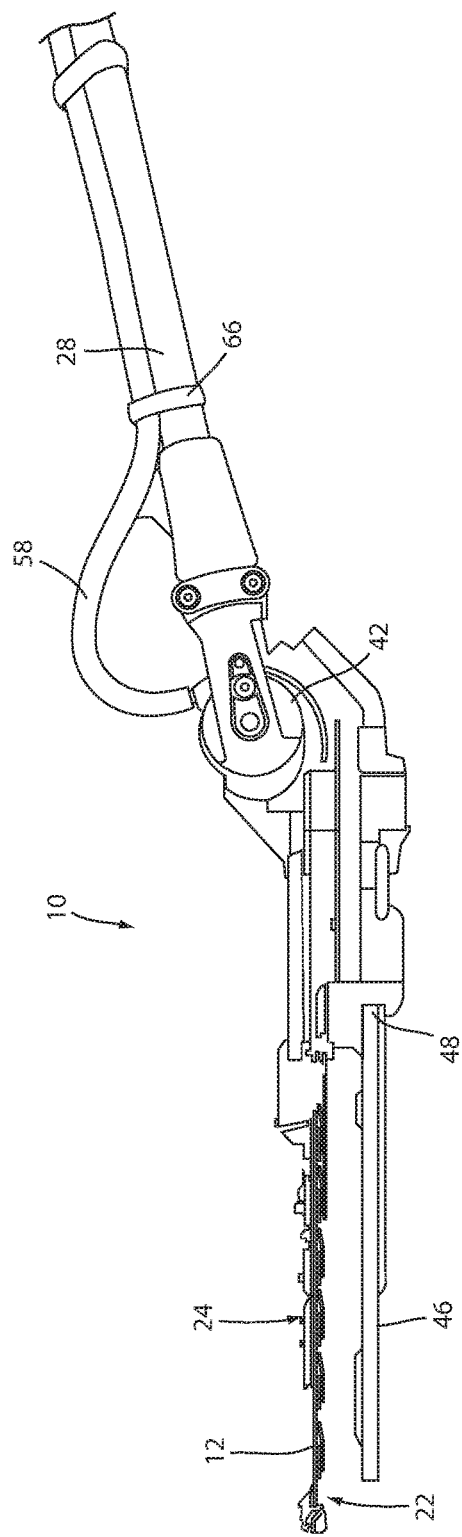
FIG. 6 is a side elevation view of the vegetation cut and chemical application apparatus of FIG. 1, installed on a swing arm and elongated fibrous member removed for clarity.
Figure 8:
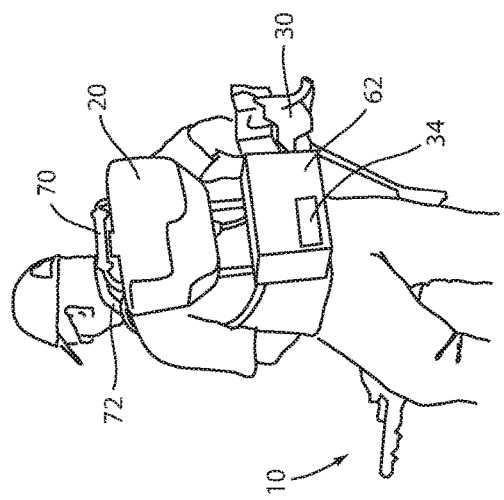
FIG. 8 is a rear elevation view of a reserve container, a controller, and a pump of the vegetation cut and chemical application apparatus, on an operator.
Figure 8:
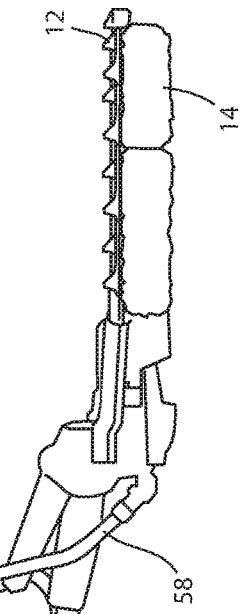
Figure 7:
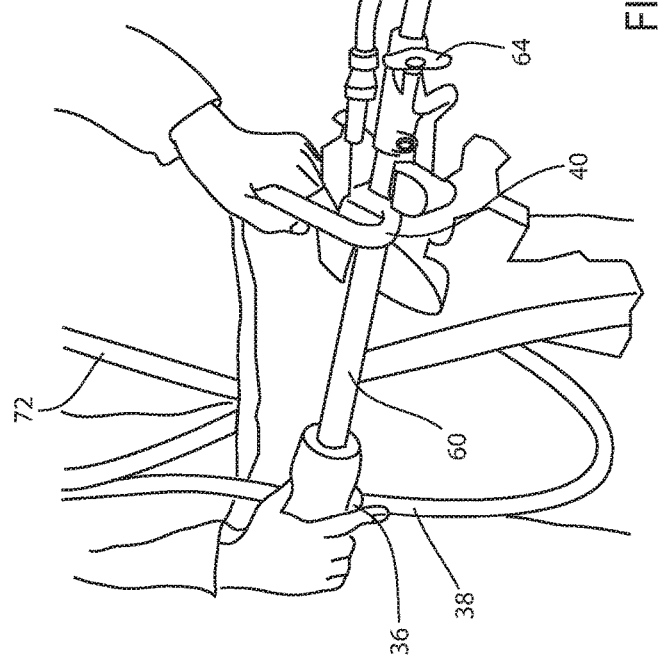
FIG. 7 is a side elevation view of the vegetation cut and chemical application apparatus of FIG. 1, installed on a swing arm and sling held by an operator.

Referring to FIGS. 6-8, the pump 62 causes the chemical fluids to flow from the reserve container 20 to the applicator 14. The reserve container 20 holds the chemical fluid and, in the illustrated embodiment, causes the chemical fluids to flow from the reserve 20. The hose 58 is generally secured to the lance 28 and handle 16 by a tie or strap 66. In the illustrated embodiment, the hose 58 is flexible and fabricated from a plastic material. The reserve container 20 is fabricated from high-density polyethylene (HDPE), but it will be appreciated that other materials suitable for chemical storage may be used that are non-reactive with the chemical fluids. Furthermore, the reserve container 20 has a volume that is suitable for attaching to a frame 70 and harness 72 and carried on the operator's back, such as on a backpack sprayer (see FIGS. 7, 8), however, it will be further appreciated that larger volumes may be used and attached to wheels or agricultural equipment, such as a tractor or harvester (see FIGS. 9a-b).

The pump 62 is controlled by the controller 34, which may further control a solenoid valve proximate the pump 62 that is in series with the hand valve 64. A power source, such as a battery 32, powers the controller 34, pump 62, and solenoid valve, if included. The controller 34 accepts input commands from the operator, for example with a trigger 36, to operate the pump 62 and dispense the chemical fluids to the operator. Furthermore, in the illustrated embodiment, the trigger 36 also operates the cutting implement 12. Therefore, the operator easily and efficiently cuts the vegetation V and applies chemical fluids to the stump portions S while reducing waste (see FIGS. 11-13).

The controller 34 may be set for one of many operating settings, such as single shot, steady, and pulsed. An operator may use a different operating setting according to various conditions, such as vegetation density, type of vegetation, type of chemical fluids, and goal of cutting and chemical application. In the illustrated embodiment, the pump 62, controller 34, and hose includes commercially available off-the-shelf components, but it will be appreciated that varied, custom components may be used. In alternative embodiments, however, the apparatus 10 may include a different type of pump, or use only gravity instead of the pump 62.

Figure 9A:
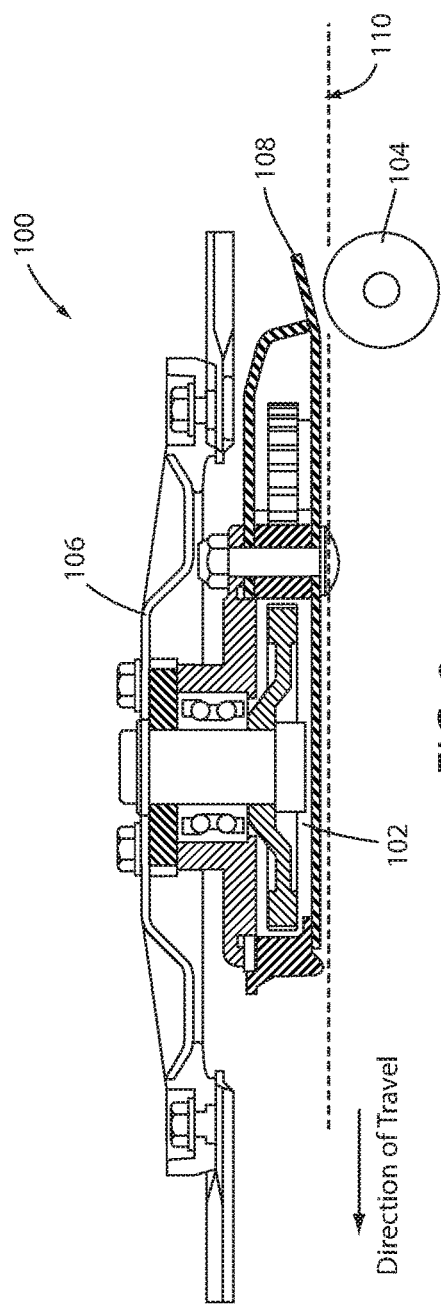
FIG. 9a is a cross-sectional view of an alternative embodiment of an vegetation cut and chemical application apparatus on a rotary motor.

In an alternative embodiment, shown in FIG. 9a, the apparatus 100 includes an applicator 104 attached to a mower, particularly a rotary mower with a rotating cutting implement 102. In particular, the applicator 104 is mounted to a housing 106 that is proximate a trailing edge 108 of the mower, behind the rotary cutting implement 102 and a discharge. The rotary mower may be propelled across vegetation V in direction D, such as a grass field or ditch, by manually pushing the rotary mower or a drive engine, such as an internal combustion engine of a tractor or harvester. The cutting implement 102 of the rotary mower cuts the vegetation V and directs the biomass B toward the discharge, generally perpendicular to the cross-section shown in FIG. 9a by the centripetal forces imparted by the cutting implement 102. The discharge is in communication with a collector, such as a wagon or a bin, which contains the discharged biomass B until the operator has completed cutting the vegetation V.

In the illustrated embodiment, the applicator 104 is porous and includes an elongated fibrous member and a fill pipe. The applicator 104 is further disposed behind the rotary cutting implement 102 and below a cutting plane 110 of the cutting implement 102. The applicator 104 is configured so that the chemical fluid enters the fill pipe at a first end and dispenses through a plurality of apertures of the fill pipe to the elongated fibrous member. For example, in the illustrated embodiment, the elongated fibrous member encompasses the fill pipe, and both are mounted the housing 106. The chemical fluid soaks into an interior side of the fibrous elongated member and dispenses from an exterior side of the member. Therefore, the apparatus 100 dispenses the chemical fluid evenly across the applicator 104. In the illustrated embodiment, the applicator 104 is fabricated from multiple rollers, similar to paint rollers. In an alternative embodiment, the applicator is fabricated from an elongated canvas tube, similar to a fire hose. Therefore, it will be appreciated that many types of fibrous materials may be used for the applicator 104.

Because the applicator 104 is affixed proximate to the trailing edge 108 of the housing 106 and behind and below a cutting plane 110 of the cutting implement 102, the applicator 104 is separated from the cutting plane 110. The applicator 104, therefore, only applies the chemical fluid only to the stump S of the vegetation V and none of the chemical fluid reaches the biomass B, such that the apparatus 100 does not contaminate the biomass B. Since the biomass B has low chemical residues, the biomass B is available for further use in downstream processes. Furthermore, since the apparatus 100 cuts the vegetation V with the cutting implement 102 and applies chemical fluids to the stump portion S with the applicator 104 in concurrent movements, the apparatus 100 is particularly well suited for efficiently cutting and treating a wide area of vegetation V.

Other aspects of the controller, pump, and solenoid valve of the apparatus 100 are similar to embodiment described above and shown in FIGS. 1-8. However, because the cutting implement 102 and the applicator 104 may be mounted to the housing 106 on rotary mower, distal from the operator, rather than on a handle, a trigger or switch may be proximate the operator. Furthermore, the pump and cutting implement 102 may be powered by a power source of the rotary mower, such as a battery, internal combustion engine, or a power takeoff unit of the engine. In alternative embodiments in which the apparatus 100 is mounted to an agricultural vehicle, the trigger, which may be a switch, is placed proximate the operator.

Figure 9B:
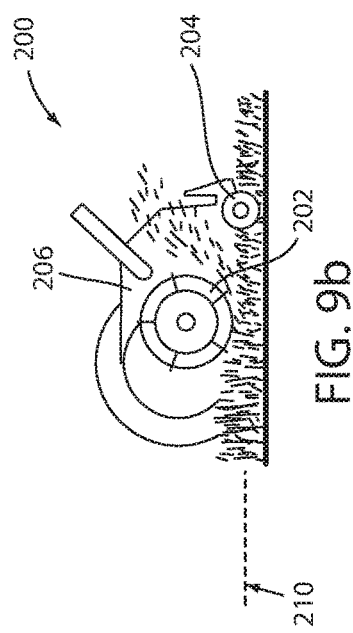
FIG. 9b is a cross-sectional view of an alternative embodiment of a vegetation cut and chemical application apparatus on a flail motor.

In an alternative embodiment, shown in FIG. 9b, apparatus 200 includes an applicator 204 attached to a flail mower. In particular, the applicator 204 is mounted to a housing 206 that is proximate a trailing edge 208 of the mower, behind a flail cutting implement 202 and a discharge. The flail mower may be propelled across vegetation V in direction D, such as a grass field or ditch, by manually pushing the flail mower or a drive engine, such as an internal combustion engine of a tractor or harvester. The cutting implement 202 of the flail mower cuts the vegetation V and directs the biomass B toward the discharge, generally perpendicular to the cross-section shown in FIG. 9b by the centripetal forces imparted by the cutting implement 202. The discharge is in communication with a collector, such as a wagon or a bin, which contains the discharged biomass B until the operator has completed cutting the vegetation V.

In the illustrated embodiment, the apparatus 200 includes an applicator 204 that is porous and includes an elongated fibrous member and a fill pipe (see FIG. 5). The applicator 204 is further disposed behind the flail cutting implement 202 and below a cutting plane 210 of the cutting implement 202. The applicator 204 is configured so that the chemical fluid enters the fill pipe at a first end and dispenses through a plurality of apertures of the fill pipe to the elongated fibrous member. For example, in the illustrated embodiment, the elongated fibrous member encompasses the fill pipe, and both are mounted the housing 206. The chemical fluid soaks into an interior side of the fibrous elongated member and dispenses from an exterior side of the member. Therefore, the apparatus 200 dispenses the chemical fluid evenly across the applicator 204. In the illustrated embodiment, the applicator 204 is fabricated from multiple rollers, similar to paint rollers. In an alternative embodiment, the applicator is fabricated from an elongated canvas tube, similar to a fire hose. Therefore, it will be appreciated that many types of fibrous materials may be used for the applicator 204.

Because the applicator 204 is affixed proximate to the trailing edge 208 of the housing 206 and behind and below cutting plane 210 of the cutting implement 202, the applicator 204 is separated from the cutting plane 210. The applicator 204, therefore, only applies the chemical fluid only to the stump S of the vegetation V and none of the chemical fluid reaches the biomass B, such that the apparatus 200 does not contaminate the biomass B. Since the biomass B has low chemical residue, the biomass B is available for further use in downstream processes. Furthermore, since the apparatus 200 cuts the vegetation V with the cutting implement 202 and applies chemical fluids to the stump portion S with the applicator 204 in concurrent movements, the apparatus 200 is particularly well suited for efficiently cutting and treating a wide area of vegetation V.

Other aspects of the controller, pump, and solenoid valve of the apparatus 200 are similar to embodiment described above and shown in FIGS. 1-8. However, because the cutting implement 202 and the applicator 204 may be mounted to the housing 206 on flail mower, distal from the operator, rather than on a handle, a trigger or switch may be proximate the operator. Furthermore, the pump and cutting implement 202 may be powered by a power source of the flail mower, such as a battery, internal combustion engine, or a power takeoff unit of the engine.

Thus, it will be appreciated that the apparatus and method can cut vegetation V and apply chemical fluids to the stump S efficiently over wide areas, particularly with common mechanical devices such as sickle bar trimmers, rotary mowers, and flail mowers. Furthermore, the chemical fluids are precisely applied so that the biomass B has low chemical residue and the chemicals do not disturb the soil. The apparatus cuts vegetation V with the cutting implement and applies chemical fluids to the stumps S behind and below the cutting plane of the implement. Therefore, the biomass B is has low chemical residue and soil residues are reduced, chemical waste is reduced (see FIGS. 11-13), undesired stump portions S is treated with a correct dosage, and manual labor is dramatically reduced. Thus, soil residues are reduced and biomass B is preserved for further downstream processes or growth.

Relative terms such as "above," "below," "behind," "vertical," "horizontal," and "wide," are used for orientation purposes to relate elements, and are to be used for consistency regardless of axis or rotation. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method for cutting and applying a chemical to vegetation comprising:
   cutting vegetation stems with a cutting implement to remove biomass from said stems from above the cutting implement and leaving stump portions of the vegetation stems below the cutting implement;
   applying a chemical below the cutting implement to the stump portions of said vegetation stems below said cutting implement substantially contemporaneously in a substantially continuous motion with said cutting vegetation stems, wherein the chemical is applied to the stump portions of the vegetation stems and not to the biomass; and collecting the removed biomass for further processing for at least one chosen from invasive species removal, food production, biofuel production, wastewater treatment, and biological remediation.

2. The method as claimed in claim 1, wherein applying said chemical to said stump portion comprises applying chemical to an applicator for applying said chemical to said stump portion.

3. The method as claimed in claim 2, wherein applying said chemical to said applicator further comprises controlling a flow of said chemical from a reserve container to said applicator.

4. The method as claimed in claim 3, wherein controlling said flow of said chemical to said applicator is substantially synchronous to said cutting vegetation stems.

5. The method as claimed in claim 3, wherein controlling a flow of said chemical to said applicator further comprises operating a valve for causing gravity to force said chemical from said reserve container to said applicator.

6. The method as claimed in claim 3, wherein controlling a flow of said chemical from said reserve container to said applicator further comprises operating a pump to cause said chemical from said reserve container to said applicator.

7. The method as claimed in claim 1, wherein said chemical comprises at least one chosen from herbicides, selective insecticides, fungicides, growth regulators, or vegetation nutrients.

8. The method as claimed in claim 1, further comprising securing said cutting implement and said applicator to an agricultural vehicle and operating said agricultural vehicle.

9. The method as claimed in claim 8, wherein operating said agricultural vehicle provides power to said cutting implement and said applicator.

10. A method for cutting and applying a chemical to vegetation comprising:
cutting vegetation stems with a cutting implement to remove biomass from said stems from above the cutting implement and leaving stump portions of the vegetation stems below the cutting implement; and
applying a chemical below the cutting implement to the stump portions of said vegetation stems below said cutting implement substantially contemporaneously in a substantially continuous motion with said cutting vegetation stems, wherein the chemical is applied to the stump portions of the vegetation stems and not to the biomass, wherein said chemical comprises at least one chosen from herbicides, selective insecticides, fungicides, growth regulators, or vegetation nutrients.

11. The method as claimed in claim 10, wherein applying said chemical to said stump portion comprises applying chemical to an applicator for applying said chemical to said stump portion.

12. The method as claimed in claim 11, wherein applying said chemical to said applicator further comprises controlling a flow of said chemical from a reserve container to said applicator.

13. The method as claimed in claim 12, wherein controlling said flow of said chemical to said applicator is substantially synchronous to said cutting vegetation stems.

14. The method as claimed in claim 12, wherein controlling a flow of said chemical to said applicator further comprises operating a valve for causing gravity to force said chemical from said reserve container to said applicator.

15. The method as claimed in claim 12, wherein controlling a flow of said chemical from said reserve container to said applicator further comprises operating a pump to cause said chemical from said reserve container to said applicator.

16. The method as claimed in claim 10, further comprising securing said cutting implement and said applicator to an agricultural vehicle and operating said agricultural vehicle.

17. The method as claimed in claim 16, wherein operating said agricultural vehicle provides power to said cutting implement and said applicator.

18. A method for cutting and applying a chemical to vegetation comprising:
cutting vegetation stems with a cutting implement to remove biomass from said stems from above the cutting implement and leaving stump portions of the vegetation stems below the cutting implement; and
applying a chemical below the cutting implement to the stump portions of said vegetation stems below said cutting implement, substantially contemporaneously in a substantially continuous motion with said cutting vegetation stems, wherein the chemical is applied to the stump portions of the vegetation stems and not to the biomass, wherein applying said chemical to said stump portions comprises applying chemical to an applicator and applying said chemical to said stump portions with said applicator and further comprises controlling a flow of said chemical from a reserve container to said applicator by operating a pump to cause said chemical from said reserve container to said applicator.

19. The method as claimed in claim 18, wherein controlling said flow of said chemical to said applicator is substantially synchronous to said cutting vegetation stems.

20. The method as claimed in claim 18, wherein controlling a flow of said chemical to said applicator further comprises operating a valve for causing gravity to force said chemical from said reserve container to said applicator.

21. The method as claimed in claim 18, further comprising securing said cutting implement and said applicator to an agricultural vehicle and operating said agricultural vehicle.

22. The method as claimed in claim 18, wherein operating said agricultural vehicle provides power to said cutting implement and said applicator.

23. A method for cutting and applying a chemical to vegetation comprising:
cutting vegetation stems with a cutting implement to remove biomass from said stems from above the cutting implement and leaving stump portions of the vegetation stems below the cutting implement;
applying a chemical below the cutting implement to the stump portions of said vegetation stems below said cutting implement substantially contemporaneously in a substantially continuous motion with said cutting vegetation stems, wherein the chemical is applied to the sump portions of the vegetation stems and not to the biomass; and
securing said cutting implement and said applicator to an agricultural vehicle and operating said agricultural vehicle, wherein operating said agricultural vehicle provides power to said cutting implement and said applicator.

24. The method as claimed in claim 23, wherein applying said chemical to said stump portion comprises applying chemical to an applicator for applying said chemical to said stump portion.

25. The method as claimed in claim 24, wherein applying said chemical to said applicator further comprises controlling a flow of said chemical from a reserve container to said applicator.

26. The method as claimed in claim 25, wherein controlling said flow of said chemical to said applicator is substantially synchronous to said cutting vegetation stems.

27. The method as claimed in claim 25, wherein controlling a flow of said chemical to said applicator further comprises operating a valve for causing gravity to force said chemical from said reserve container to said applicator.

* * * * *